3,468,982
PROPENE-3-PHOSPHONATES AND POLYMERS
THEREOF
Harvey Gerald Klein, Stamford, and Allan Ellis Sherr, Norwalk, Conn., assignors to American Cyanamid Company, Stamford, Conn., a corporation of Maine
No Drawing. Filed July 1, 1965, Ser. No. 468,922
Int. Cl. C07f 9/40; C08f 3/84, 25/00
U.S. Cl. 260—941                                                    1 Claim

ABSTRACT OF THE DISCLOSURE

Propene-3-phosphonates are provided having the formula

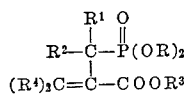

wherein $R^4$ is hydrogen or aryl; $R^1$, $R^2$ and $R^3$ are hydrogen, aryl or $C_1$ to $C_4$ alkyl; and R is alkyl, cycloalkyl, alkenyl, cycloalkenyl, aryl or part of a heterocyclic ring containing the adjacent phosphonate group. These compounds form fire-retardant homopolymers and copolymers with terminally unsaturated compounds such as methyl methacrylate.

---

This invention relates to phosphorus-containing compounds, to homopolymers and copolymers of the same, and to fire-retardant compositions and molded articles of manufacture containing such compounds, homopolymers or copolymers.

The phosphorus-containing compound of the invention has the formula

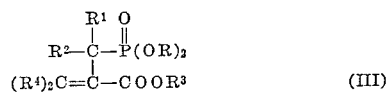 (III)

wherein R is selected from the group consisting of alkyl, cycloalkyl, alkenyl, cycloalkenyl, aryl, and aliphatic groups which together with both OR groups and R form a heterocyclic ring; $R^1$ and $R^2$ are selected from the group consisting of hydrogen, alkyl ($C_1$–$C_4$) and aryl; $R^3$ is selected from the group consisting of hydrogen, alkyl ($C_1$–$C_4$) and aryl; and $R^4$ is selected from the group consisting of hydrogen and aryl.

This product is prepared by a Michaelis-Arbuzov reaction as follows:

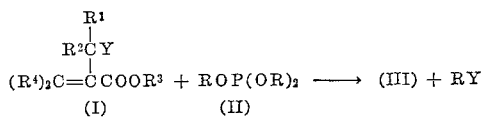

where R, $R^1$, $R^2$, $R^3$ and $R^4$ are as described above and Y is chlorine or bromine.

The reactants defined by Formulas I and II are known compounds and many are commercially available.

Nonlimiting examples of reactant I are methyl 2-(chloromethyl)acrylate, methyl 2-(bromomethyl)acrylate, 2-(chloromethyl)acrylic acid, phenyl 2-(chloromethyl)acrylate, methyl 2-(chloro methyl)-3-phenyl acrylate, and the like. These and other reactants of Formula I are disclosed together with details of preparation in U.S. Patent No. 3,213,072 dated Oct. 19, 1965.

Nonlimiting examples of phosphite reactants of Formula II are:

trimethyl phosphite
triethyl phosphite
tributyl phosphite
triisopropyl phosphite
trihexyl phosphite
trioctyl phosphite
tridecyl phosphite
trilauryl phosphite
tri(2-ethylhexyl)phosphite
tri-n-octadecyl phosphite
tristearyl phosphite
tricyclophentyl phosphite
tricyclohexyl phosphite
tricycloheptyl phosphite
triallyl phosphite
tributenyl phosphite
tripentenyl phosphite
tricyclopentenyl phosphite
tricyclohexenyl phosphite
triphenyl phosphite
tritolyl phosphite
trinaphthyl phosphite
tri-1-anthryl phosphite
tri-2-decahydronaphthyl phosphite
tri-o-cyclohexylphenyl phosphite
tri(p-isopropylphenyl)phosphite
tri(p-tert-butylphenyl)phosphite
phenylneopentyl phosphite
tri(4-tert-butylphenyl)phosphite
di(p-tert-butylphenyl)phenyl phosphite
diphenyl-p-tert-butylphenyl phosphite
biphenyldiphenyl phosphite
didecylphenyl phosphite
diphenyldecyl phosphite
diphenylbutyl phosphite
diphenylpropyl phosphite
di(biphenyl)phenyl phosphite From these lists it will be appreciated that $R^1$ and $R^2$ of Formula III may be the same or different and likewise for the R, $R^3$ and $R^4$ groups. Moreover R's may be joined to form a heterocyclic ring containing the two oxygen atoms and the phosphorus atom as in the case when phenylneopentyl phosphite is a reactant. The preferred carbon range for each of R, $R^1$, $R^2$, $R^3$, $R^4$ and rings containing two R groups is $C_1$–$C_{18}$, inclusive.

The method of preparing compounds of the invention, Formula III, is conventional and forms no part of the present invention. Typical reaction conditions include reaction of the acrylate or acrylic acid of Formula I with a stoichiometric amount or excess, e.g., 10–50% of a molecular equivalent excess, of a phosphite of Formula II and reaction at from about 80° C. to 220° C. for a time sufficient to complete the reaction as evidenced by cessation of formation of byproduct halide (RY).

Reaction is conveniently effected in the presence of an inhibiting amount of a polymerization inhibitor such as the well-known phenolic inhibitors. Typical inhibitors are 4,6-dinitrocresol, 2,6-ditertiary butyl p-cresol, 2,2'-methylenebis(4-ethyl-6-t-butylphenol), 4,4'-thiobis(3-methyl-6-t-butylphenol), and the like.

Excess phosphite is preferred since most of the phosphites are liquids and therefrom function as solvent and reaction medium. However, conventional solvents may be employed if desired.

Actual reaction conditions will depend on the reactants employed. For example, the simple phosphites, e.g., trialkyl phosphites, are more reactive and thus require only slight heating, e.g., in the 80–120° C. range. Several hours reaction, e.g., 3 to 8 hours, is generally sufficient for completeness.

Other details of this reaction type may be found in Topics in Phosphorus Chemistry, vol. 1, pp. 57–111, Interscience Publishers, Wiley and Sons, New York (1964), incorporated herein by reference.

The compounds (III) of the invention are vinyl monomers, i.e., ethylenically unsaturated compounds, and are therefore homopolymerizable or copolymerizable with other monomers. Thus, to form copolymers, two or more may be reacted together, or one or more monomers of Formula III may be reacted with one or more monomers not defined by Formula III.

In general, monomers not of Formula III but copolymerizable with one or more compounds of Formula III are ethylenically unsaturated compounds containing the terminal grouping

Nonlimiting examples of these are the acrylates and methacrylates, e.g., methyl acrylate, ethyl acrylate, n-propyl acrylate, isopropyl acrylate, n-butyl acrylate, t-butyl acrylate, isobutyl acrylate, n-amyl acrylate, t-amyl acrylate, hexyl acrylate and their corresponding alkyl methacrylates; vinyl esters, e.g., vinyl acetate; vinyl cyclic compounds (including monovinyl aromatic hydrocarbons), e.g., styrene, o-, m-, and p-chlorostyrenes, -bromostyrenes, -fluorostyrenes, -methylstyrenes, -ethylstyrenes, -cyanostyrenes; the various poly-substituted styrenes, e.g., the various di-, tri-, and tetra-chlorostyrenes, -bromostyrenes, -fluorostyrenes, -methylstyrenes, -ethylstyrenes, -cyanostyrenes; vinyl pyridine, divinyl benzene, diallyl benzene, the various allyl cyanostyrenes, the various alpha-substituted styrenes and alpha-substituted ring-substituted styrenes, e.g., alpha-methyl styrene, alpha-methyl-para-methyl styrene; unsaturated ethers, e.g., ethyl vinyl ether, diallyl ether; unsaturated amides, e.g., N-allyl caprolactom, acrylamide; N-substituted acrylamides, e.g., N-methylol acrylamide, N-allyl acrylamide, N-methyl acrylamide, N-phenyl acrylamide; unsaturated ketones, e.g., methyl vinyl ketone, methyl allyl ketone; methylene malonic esters, e.g., methylene methyl malonate; α-olefins, e.g., ethylene, propylene; vinyl halides, e.g., vinyl fluoride, vinyl chloride, vinyl bromide, vinyl iodide; allyl compounds, e.g., allyl methacrylate, allyl alcohol, methallyl alcohol, diallyl carbonate, allyl lactate, allyl alphahydroxyisobutyrate, allyl trichlorosilane, diallyl phthalate, diallyl methylgluconate, diallyl tartronate, diallyl tartrate, diallyl mesaconate, the diallyl ester of muconic acid, diallyl chlorophthalate, diallyl dichlorosilane, the diallyl ester of endomethylene tetrahydrophthalic anhydride, triallyl tricarballylate, triallyl cyanurate, triallyl citrate, triallyl phosphate, tetrallyl silane, tetrallyl silicate, hexallyl disioxane, allyl diglycol carbonate, etc. Other examples of allyl compounds that may be employed are given, for example, in U.S. Patent No. 2,510,503, issued June 6, 1950.

The mentioned monomers may be homopolymerized or copolymerized in any known manner such as by free-radical generating catalysts, irradiation, anion and cation type catalysts and the like, said method of polymerization forming no part of the present invention.

The compounds of the invention, Formula III, when homopolymerized, copolymerized (as described above) or when incorporated into polymers prepared from ethylenically unsaturated monomers (such as described above), impart flame resistance thereto. For example, it has been found that when at least 25% of a compound of Formula III, based on the weight of the resultant composition, is copolymerized with methyl methacrylate, the product exhibits self-extinguishing properties. Proportions of the monomer compound, Formula III, in the flame resistant composition may be varied widely, even up to 99%, depending on the comonomer or polymer into which it is incorporated as well as on the mechanical and electrical properties desired in the final product. Generally, proportions for optimum balance of flame resistance and other desirable properties are from about 20% to 30% based on the weight of final product.

Particularly desirable polymers or copolymers for admixture with product (III) of the invention are polymethyl methacrylate, polyvinyl acetate, polyvinyl butyral, polystyrene, acrylonitrile-butadiene-styrene, polyethylene, polypropylene, and the like.

The compound of Formula III may be incorporated into polymerizable compositions or polymers to impart flame resistance thereto by any known method. Thus, the flame retardant additive may be combined with other monomers or polymers by milling the mixture on, for example, a two-roll mill, in a Banbury mixer etc., or the compound may be added by mixing it and other monomer or polymer simultaneously and extruding, or by merely blending a monomer or polymer in powder form with the compound and thereafter forming the final desired article. Additionally, the compound may be added during resin manufacture, e.g., during the monomer polymerization procedure, as described above.

It is also within the scope of the present invention to incorporate into the foregoing compositions such ingredients as plasticizers, dyes, fillers, pigments, stabilizers, lubricants, antioxidants, antistatic agents and the like.

Molded or cast articles made from the homopolymers, copolymers or mixtures of the invention are eminently useful in innumerable forms wherever flame retardance is desired, e.g., castings for live electrical contacts, ash trays, waste baskets, fibers, toys, coatings, films and the like.

In order that the present invention may be more completely understood, the following examples are given in which all parts and percentages are by weight unless otherwise specified. These examples are set forth primarily for the purpose of illustration and any specific enumeration of detail contained therein should not be interpreted as a limitation on the case except where indicated in the appended claim.

EXAMPLE 1

Preparation of diethyl 2-(carbomethyoxymethyl)-propene-3-phosphonate

Triethyl phosphite (34 g., 0.2 mole) is added dropwise to a stirred mixture of methyl 2-(chloromethyl) acrylate (13 g., 0.1 mole) and 4,6-dinitro-o-cresol (0.5 g., 0.0025 mole) in a nitrogen atmosphere. The temperature is maintained below 10° C. The reaction mixture is stirred 5 minutes after the addition is complete and allowed to warm to room temperature. An exotherm is observed at this point and the temperature is kept below 35° C. by cooling until the exotherm subsides. The mixture is then heated at 90° C.±2° C. for 5 hours, then cooled to room temperature and allowed to stand several hours. Thereafter, excess triiethyl phosphite is distilled off in vacuo, and the residue distilled to give 18.1 g. of material, B.P. 80–91° C./0.025 mm., representing a 76.6% yield of crude products. Redistillation through a short Vigreau column gives a major fraction of diethyl 2-(carbomethoxymethyl)-propene-3-phosphonate, B.P. 86–89.5° C./0.15 mm.

EXAMPLE 2

The product of example 1, when milled at about 170° C. with polymethyl methacrylate molding powder at a concentration of 25% by weight of mixture, gives molded specimens which are clear, yellow and self-extinguishing.

The flame resistance test is a modification of ASTM D–635–56T conducted as follows: A specimen, 5" in length, 0.5" in width and 0.045" in thickness, is marked at the 1" and 4" lengths and is then supported with its longitudinal axis horizontal and its transverse axis inclined at 45° to the horizontal. A Bunsen burner with a 1" blue flame is placed under the free end of the strip and is adjusted so that the flame tip is just in contact with the strip. At the end of 30 seconds, the flame is removed and the specimen is allowed to burn. If the specimen does not continue to burn after the first ignition it is immediately recontacted with the burner for another 30 second period. If, after the two burnings, the strip is not burned to the 4" mark, the specimen is designated as "self-extinguishing" or "flame-retardant."

EXAMPLE 3

The product of Example 1 is bulk-homopolymerized in the presence of benzoyl peroxide employing conventional bulk polymerization conditions. The resinous product, though low in molecular weight, exhibits flame resistance.

EXAMPLE 4

Methyl methacrylate is copolymerized with the product of Example 1 in the presence of benzoyl peroxide using a conventional bulk polymerization technique. The molded specimens are hard, clear and yellow. When tested according to the procedure of Example 2, specimens containing 20% by weight of the phosphonate of Example 1 burn but other specimens containing 25% by weight of the same phosphonate are self-extinguishing.

EXAMPLE 5

The product of the phosphonate of Example 1 (15% by weight) and styrene is bulk-copolymerized in a conventional manner to yield a resin which is hazy, yellow, and self-extinguishing when tested as in Example 2.

We claim:
1. Diethyl 2 - (carbomethoxymethyl)propene - 3 - phosphonate.

References Cited

UNITED STATES PATENTS

| | | | |
|---|---|---|---|
| 2,636,027 | 4/1953 | Coover et al. | 260—85.5 |
| 3,196,190 | 7/1965 | Mischk et al. | 260—869 |
| 3,213,072 | 10/1965 | Hoffenberg et al. | 260—89.5 |

JOSEPH L. SCHOFER, Primary Examiner

J. C. HAIGHT, Assistant Examiner

U.S. Cl. X.R.

260—78.5, 80.71, 85.5, 85.7, 86.1, 87.5, 88.1, 89.1, 89.3